US007353318B2

(12) United States Patent
Elliot et al.

(10) Patent No.: US 7,353,318 B2
(45) Date of Patent: Apr. 1, 2008

(54) APPARATUS AND METHOD TO ASSIGN ADDRESSES TO PLURALITY OF INFORMATION STORAGE DEVICES

(75) Inventors: John C. Elliot, Tucson, AZ (US); Shah Mohammad Rezaul Islam, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 11/213,128

(22) Filed: Aug. 26, 2005

(65) Prior Publication Data
US 2007/0050568 A1    Mar. 1, 2007

(51) Int. Cl.
*G06F 12/00* (2006.01)

(52) U.S. Cl. .................... 711/4; 711/100; 711/170; 711/203; 711/202

(58) Field of Classification Search ............ 711/4, 711/100, 170, 203, 202; 714/1, 2, 7
See application file for complete search history.

(56) References Cited

U.S. PATENT DOCUMENTS

2003/0217305 A1*  11/2003  Krehbiel et al. ............... 714/6

\* cited by examiner

*Primary Examiner*—Kimberly Mclean
(74) *Attorney, Agent, or Firm*—Chandler & Udall, LLP; Dale F. Regelman

(57) ABSTRACT

A method is disclosed to assign addresses to a plurality of data storage devices. The method provides a switch and (N) data storage devices, where each of those (N) data storage devices is interconnected with said switch. The method further establishes (M) device addresses, where (M) is less than (N), and assigns a different one of each of the (M) device addresses to a different one of the (N) data storage devices, such that the (N) data storage devices comprise (M) address-assigned data storage devices and (P) non-address-assigned data storage devices. The method then detects a failure of the (i)th address-assigned data storage device, and transfers the (i)th address from the failed address-assigned data storage device to the (j)th data storage device, where that (j)th data storage device comprises one of the (P) previously non-addressed data storage devices.

9 Claims, 6 Drawing Sheets

APPARATUS AND METHOD TO ASSIGN ADDRESSES TO PLURALITY OF INFORMATION STORAGE DEVICES

FIELD OF THE INVENTION

This invention relates to an apparatus and method to assign addresses to a plurality of information storage devices.

BACKGROUND OF THE INVENTION

Data storage and retrieval systems are used to store information provided by one or more host computer systems. Such data storage and retrieval systems receive requests to write information to one or more data storage devices, and requests to retrieve information from those one or more data storage devices. Upon receipt of a read request, the system recalls information from the one or more data storage devices and moves that information to a data cache. Thus, the system is continuously moving information to and from a plurality of data storage devices, and to and from a data cache.

What is needed is an apparatus and method to assign addresses to a plurality of information storage devices disposed in an information storage and retrieval system.

SUMMARY OF THE INVENTION

Applicants' invention comprises an apparatus and method to assign addresses to a plurality of data storage devices. Applicants' method provides (N) data storage devices, where each of those (N) data storage devices is interconnected with a switch, and where each of those (N) data storage devices comprises a known physical location. Applicants' method further establishes (M) device addresses, where (M) is less than (N), and assigns a different one of each of the (M) device addresses to a different one of the (N) data storage devices, such that the (N) data storage devices comprise (M) address-assigned data storage devices and (P) non-address-assigned data storage devices.

In the event the (i)th address-assigned data storage device fails, Applicants' method then detects that failure and transfers the (i)th address from the failed address-assigned data storage device to the (j)th data storage device, where that (j)th data storage device comprises one of the (P) previously non-addressed data storage devices.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. The invention will be described as embodied in an information storage and retrieval system which comprises two clusters, each cluster comprising a plurality of device adapters and a data cache. The following description of Applicants' method is not meant, however, to limit Applicants' invention to data processing applications, as the invention herein can be generally applied to assigning addresses to a plurality of information storage devices.

Figure 1:
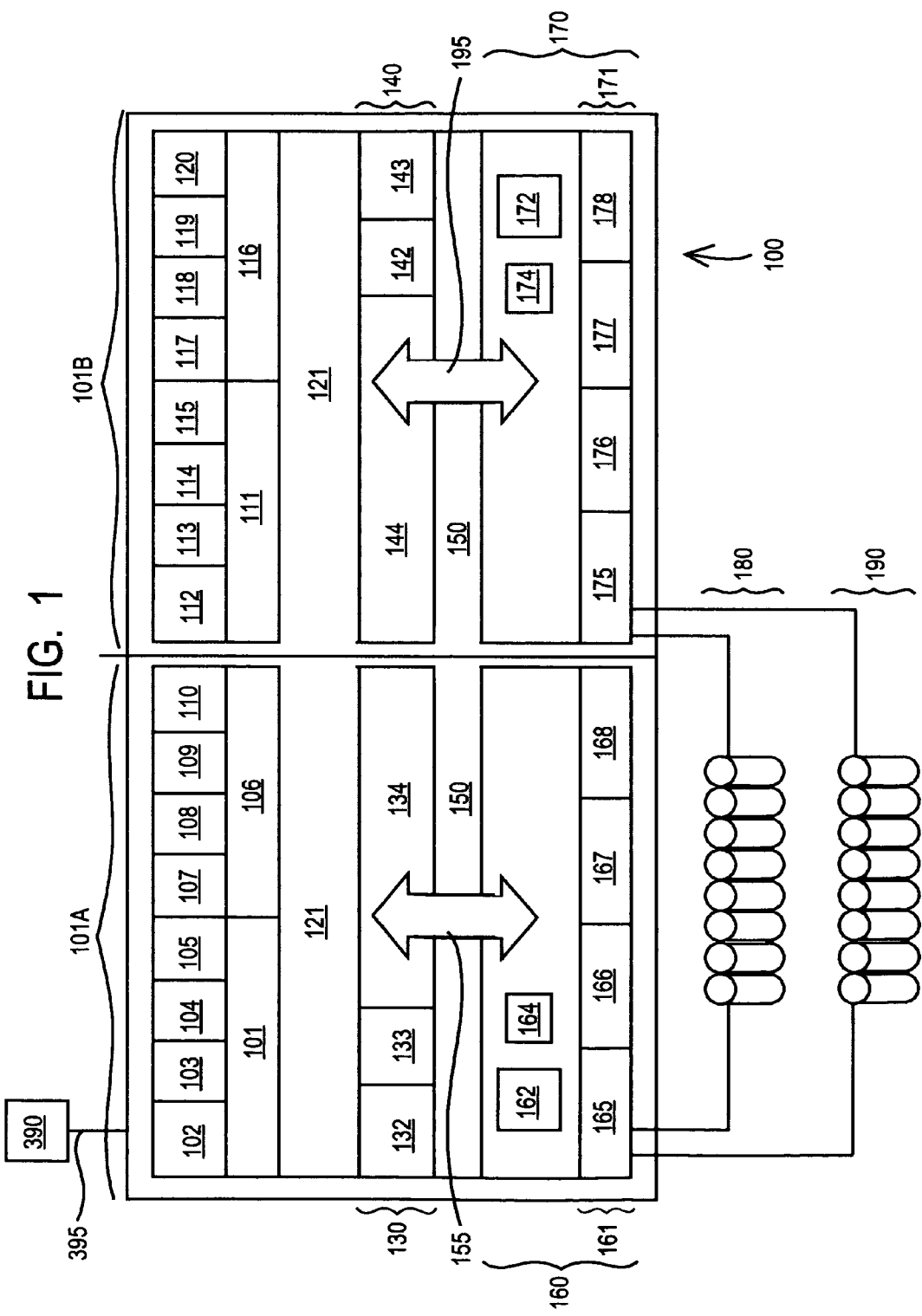
FIG. 1 is a block diagram showing one embodiment of Applicants' data storage and retrieval system.

Referring now to FIG. 1, information storage and retrieval system 100 is capable of communication with host computer 390 via communication link 395. The illustrated embodiment of FIG. 1 shows a single host computer. In other embodiments, Applicants' information storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, host computer 390 further includes a storage management program. The storage management program in the host computer 390 may include the functionality of storage management type programs known in the art that manage the transfer of data to and from a data storage and retrieval system, such as the IBM DFSMS implemented in the IBM MVS operating system.

In certain embodiments, Applicants' information storage and retrieval system includes a plurality of host adapters. In the illustrated embodiment of FIG. 1, system 100 comprises host adapters 102-105, 107-110, 112-115 and 117-120. In other embodiments, Applicants' information storage and retrieval system includes fewer than 16 host adapters. In still other embodiments, Applicants' information storage and retrieval system includes more than 16 host adapters. In certain embodiments, one or more of the host adapters are multi-ported. Regardless of the number of host adapters disposed in any embodiments of Applicants' system, each of those host adapters comprises a shared resource that has equal access to both central processing/cache elements 130 and 140.

Each host adapter may comprise one or more Fiber Channel ports, one or more FICON ports, one or more ESCON ports, or one or more SCSI ports, and the like. Each host adapter is connected to both clusters through interconnect bus 121 such that each cluster can handle I/O from any host adapter. Internal buses in each subsystem are connected via a Remote I/O bridge 155/195 between the processor portions 130/140 and I/O portions 160/170, respectively.

Processor portion 130 includes processor 132 and cache 134. In certain embodiments, processor portion 130 further includes memory 133. In certain embodiments, memory device 133 comprises random access memory. In certain embodiments, memory device 133 comprises non-volatile memory.

Processor portion 140 includes processor 142 and cache 144. In certain embodiments, processor portion 140 further includes memory 143. In certain embodiments, memory device 143 comprises random access memory. In certain embodiments, memory device 143 comprises non-volatile memory.

I/O portion 160 comprises a plurality of device adapters 161 which in the illustrated embodiment of FIG. 1 comprises device adapters 165, 166, 167, and 168. I/O portion 160 further comprise nonvolatile storage ("NVS") 162 and battery backup 164 for NVS 162.

I/O portion 170 comprises a plurality of device adapters 171 which in the illustrated embodiment of FIG. 1 comprises device adapters 175, 176, 177, and 178. I/O portion 170 further comprises nonvolatile storage ("NVS") 172 and battery backup 174 for NVS 172.

In certain embodiments of Applicants' system, one or more host adapters, processor portion 130, and one or more device adapters are disposed on a first control card disposed in Applicants' information storage and retrieval system. Similarly, in certain embodiments, one or more host adapters, processor portion 140, one or more device adapters are disposed on a second control card disposed in Applicants' information storage and retrieval system.

In the illustrated embodiment of FIG. 1, sixteen data storage devices are organized into two arrays, namely array 180 and array 190. The illustrated embodiment of FIG. 1 shows two storage device arrays.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In certain embodiments, arrays 180 and 190 comprise what is sometimes called an SBOD array, i.e. "Switched Bunch Of Disks".

The illustrated embodiment of FIG. 1 shows two storage device arrays. In other embodiments, Applicants' system includes a single storage device array. In yet other embodiments, Applicants' system includes more than two storage device arrays.

Figure 2:
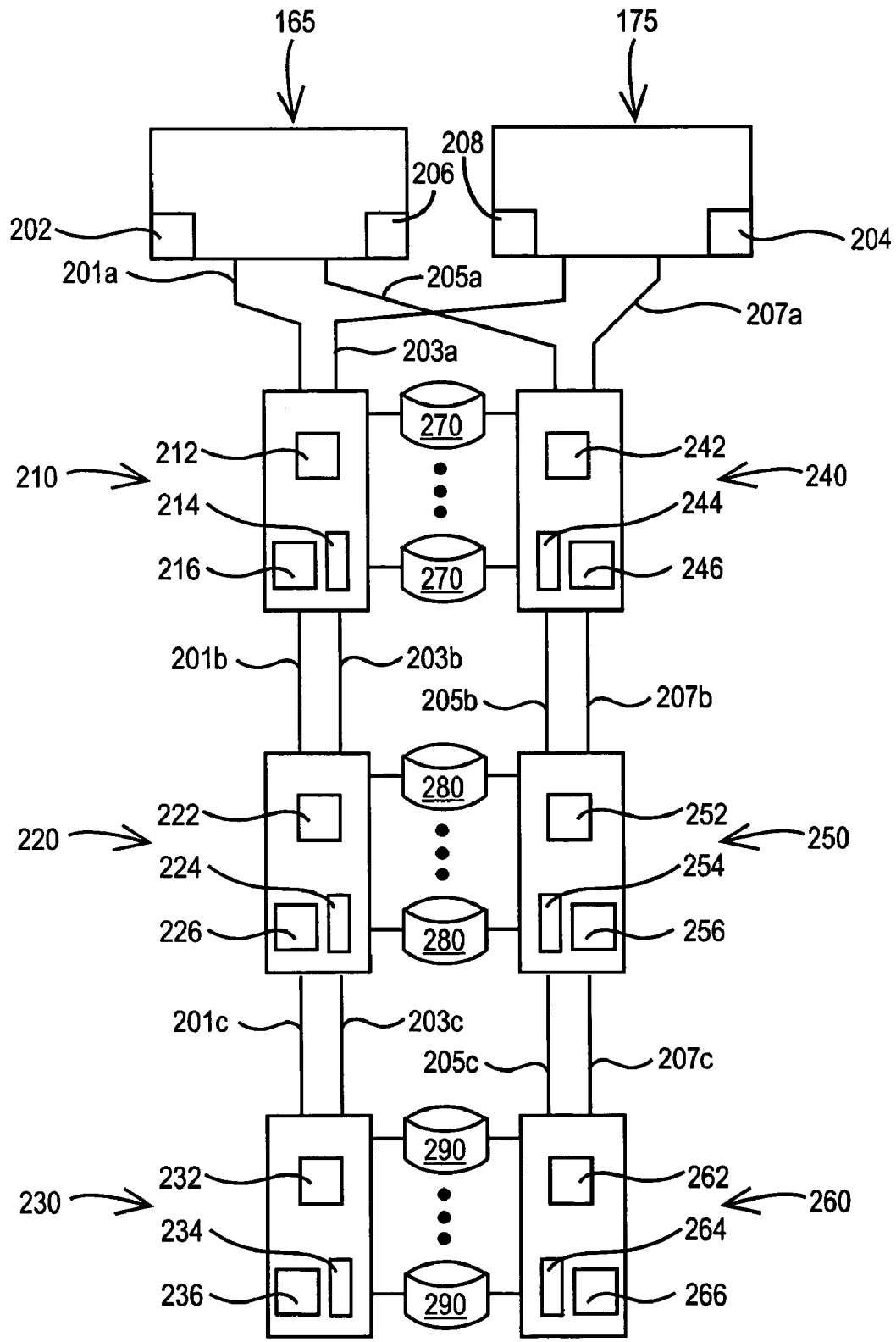
FIG. 2 is a block diagram showing the data storage and retrieval system of FIG. 1 comprising three storage arrays.

In the illustrated embodiment of FIG. 2, Applicants' information storage and retrieval system comprises dual fiber channel arbitrated ("FC-AL") loops of switches where the device adapters 165 (FIGS. 1, 2) and 175 (FIGS. 1, 2) are interconnected with two FC-AL loops. Each loop contains one or more local controllers, such as local controllers 210, 220, 230, 240, 250, and 260.

Each local controller comprises a switch, a processor, and microcode. In certain embodiments, the switch comprises a Fiber Channel switch. In certain embodiments, the processor comprises a SES processor. For example, local controllers 210, 220, 230, 240, 250, and 260, include processors 212, 222, 232, 242, 252, and 262, respectively. Similarly, local controllers 210, 220, 230, 240, 250, and 260, include switches 214, 224, 234, 244, 254, and 264, respectively. In addition, local controllers 210, 220, 230, 240, 250, and 260, include microcode 216, 226, 236, 246, 256, and 266, respectively.

Figure 3:
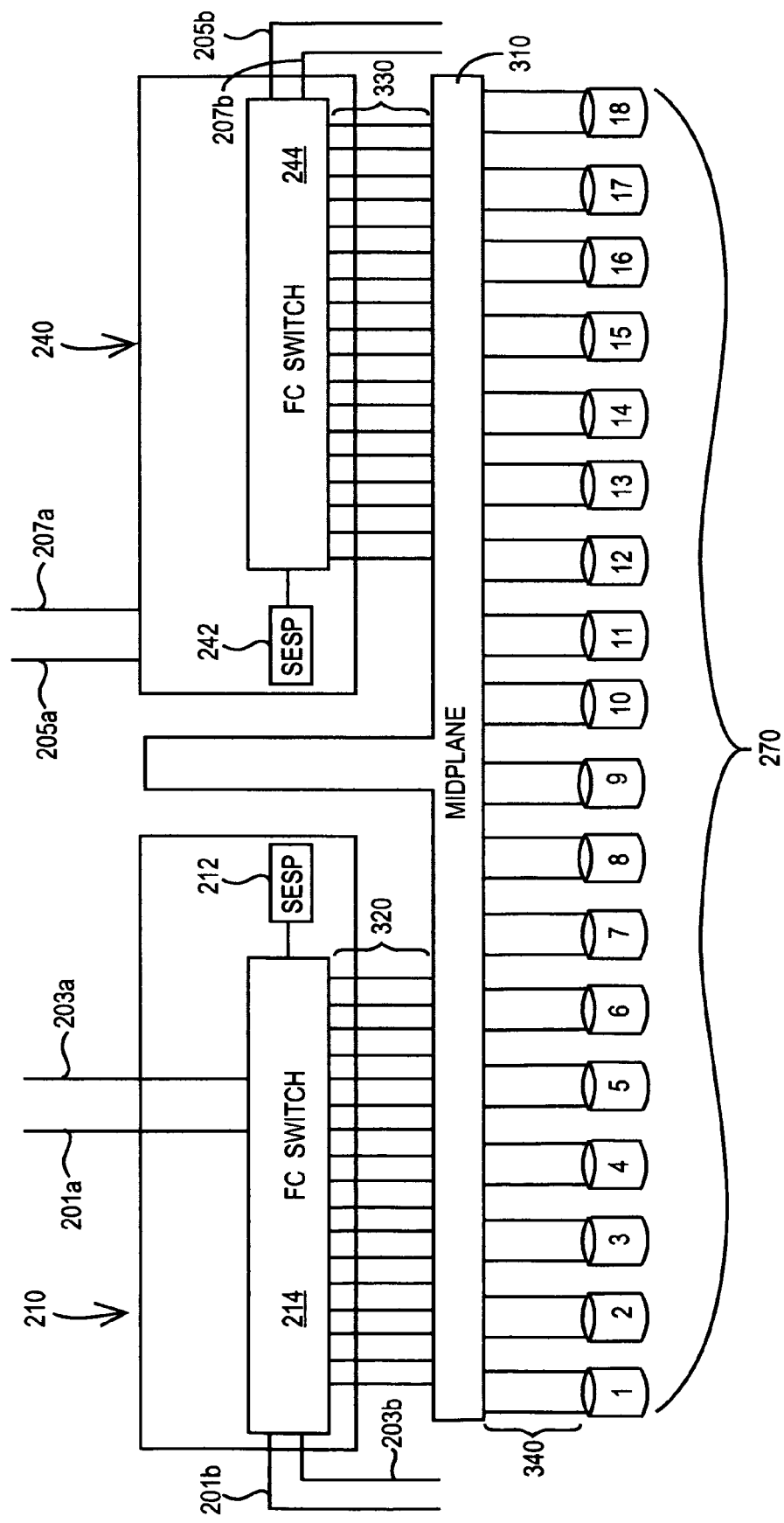
FIG. 3 is a block diagram showing one storage array interconnected to a fibre channel arbitrated loop switch.
Figure 4:
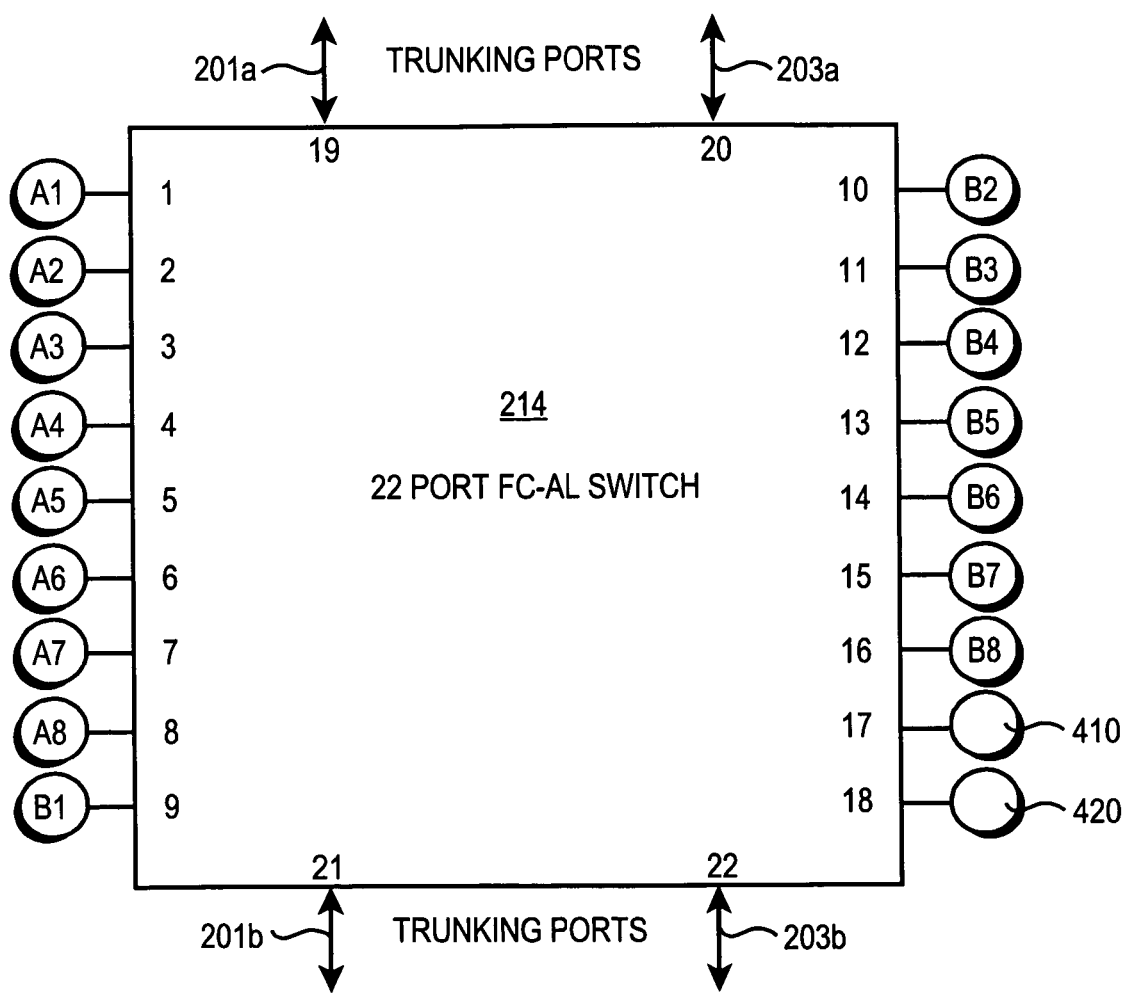
FIG. 4 is a block diagram showing a first configuration of 18 data storage devices interconnected with a 22 port switch.

In certain embodiments, Applicants' apparatus further includes a midplane interconnecting one or more switches to one or more data storage devices. In the illustrated embodiment of FIG. 3, controller 210 (FIGS. 2, 3) comprises Fiber Channel switch 214 (FIGS. 2, 3, 4) and SES processor 212 (FIGS. 2, 3, 4). A plurality of communication links 320 interconnect Fiber Channel switch 214 to midplane 310. A plurality of communication links 340 interconnect data storage devices 270 (FIGS. 2, 3, 4) with midplane 310.

Controller 240 (FIGS. 2, 3) comprises Fiber Channel switch 244 (FIGS. 2, 3, 4) and SES processor 242 (FIGS. 2, 3, 4). A plurality of communication links 330 interconnect Fiber Channel switch 244 to midplane 310.

Signals are provided by switch 214 to data storage devices 270 via communication links 320, communication links 340, and midplane 310. Similarly, signals are provided by switch 244 to data storage devices 270 via communication links 330, communication links 340, and midplane 310.

Applicants' apparatus and method addresses storage devices using an arbitrated loop physical address ("AL_PA"). The FC-AL architecture limits the number of AL_PA's available on each FC-AL loop to 127 (one for the FL Port and 126 for NL Ports). For modular storage systems, each module is typically assigned a binary multiple number of the AL_PAs available, i.e. 2, 4, 8, 16, 32, and so on. In certain embodiments, Applicants' storage arrays comprise a non-binary multiple number of storage devices. For example and referring again to FIG. 3, storage array 270 comprises 18 storage devices. In order to assign a different AL_PA to each of those 18 storage devices, a total of 32 AL_PAs would typically need to be allocated to the module. Fourteen of those allocated 32 AL_PAs would not be used.

Referring now to FIG. 4, switch 214 comprises a 22 port Fiber Channel Arbitrated Loop switch. Eighteen of the 22 ports, namely ports 1 through 18, are allocated to data storage devices. Four of the 22 ports, namely ports 19, 20, 21, and 22, are allocated to network communication. In the illustrated embodiment of FIG. 4, the sixteen of the eighteen storage devices comprise two 8 device arrays, namely array A and array B. AL_PAs are assigned to each data storage device in array A and array B.

Data storage device 410 is interconnected with switch 214 at port 17, and data storage device 420 is interconnected to switch 214 at port 18. AL_PAs are not assigned to devices 410 and 420.

In the illustrated embodiment of FIG. 4, the 18 data storage devices are directly interconnected with switch 214. In other embodiments, the 18 data storage devices are interconnected with switch 214 via a midplane, such as midplane 310 (FIG. 3).

Each of the 18 data storage devices shown in FIG. 4 is in communication with device adapters 165 (FIGS. 1, 2) 175 (FIGS. 1, 2) via switch 214 (FIGS. 2, 3, 4) and communication links 201a (FIGS. 2, 3, 4) and 203a (FIGS. 2, 3, 4), respectively. In addition, each of the 18 data storage devices shown in FIG. 4 is in communication with device adapters 165 and 175 via switch 244 (FIGS. 2, 3) and communication links 205a (FIGS. 2, 3) and 207a (FIGS. 2, 3), respectively.

Device adapters 165 and 175 share the physical data storage devices. Each device adapter "owns" logical devices that may reside on the disk. In the illustrated embodiment of FIG. 4, each device adapter comprises operational information and configuration information about each of the 18 data storage devices. Control of the logical devices transitions to an operational device adapter in the event of an adapter failure.

Such operational information comprises, inter alia, the storage capability, the signaling capability, and the like, for each of the 18 data storage devices Such configuration information comprises, inter alia, the physical locations of each of the 18 data storage devices and the AL_PAs assigned to data storage devices 1 through 16. By default, AL_PAs are assigned to data storage devices based upon the physical locations of those data storage devices. Each device adapter, however, comprises microcode which can override the default addressing.

Figure 6:
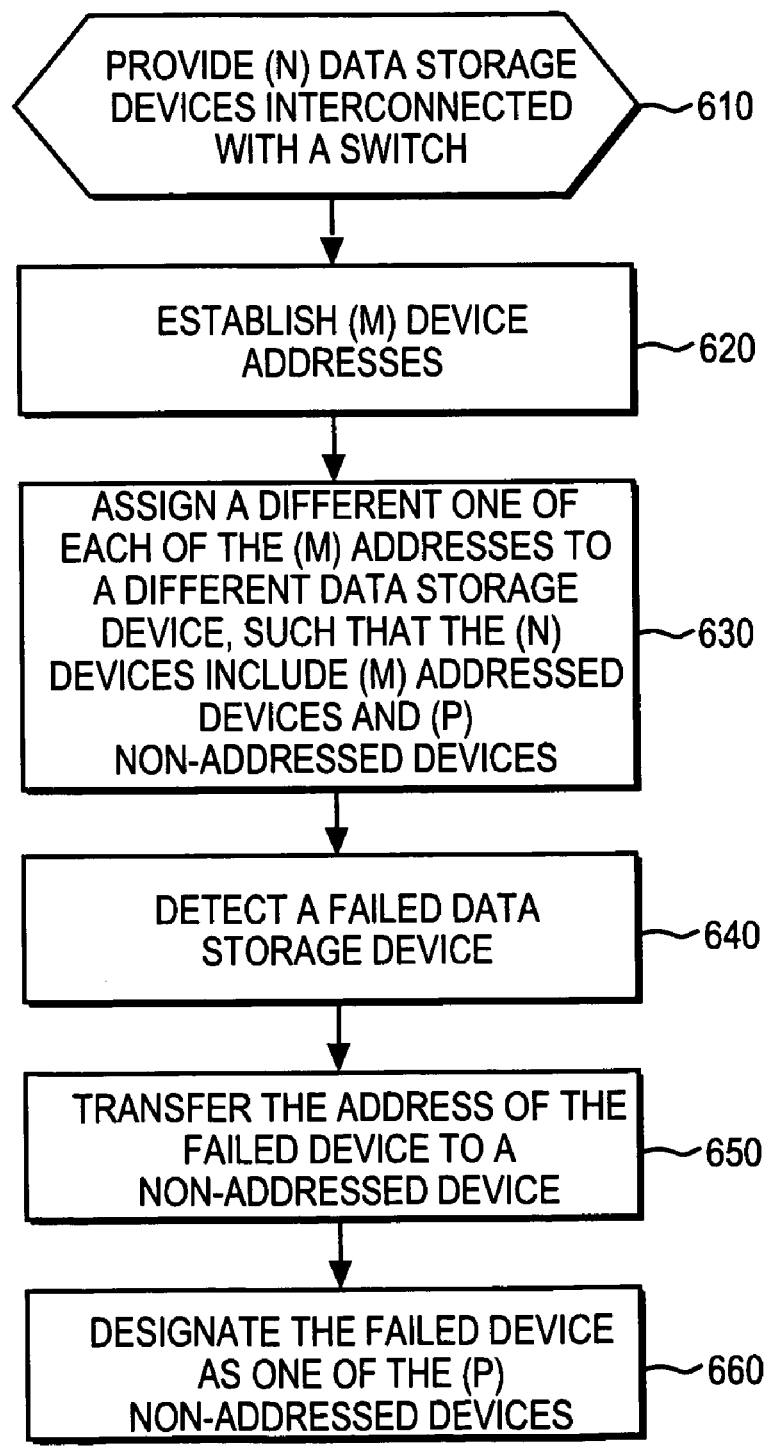
FIG. 6 is a flow chart summarizing the steps of Applicants' method.

Applicants' invention comprises a method to assign addresses to a plurality of data storage devices. FIG. 6 summarizes the steps of Applicants' method. Referring now to FIG. 6, in step 610, Applicants' method provides (N) data storage devices, such as for example the 18 data storage devices shown in FIG. 4, interconnected with a switch, such as for example switch 214. In certain embodiments, the (N) data storage devices are disposed in an information storage and retrieval system, such as for example system 100 (FIG. 1).

In step 620, Applicants' method establishes (M) device addresses. In certain embodiments, (M) differs from (N). In certain embodiments, (N) is greater than (M). In certain embodiments, (M) is a binary multiple, such as for example 2, 4, 8, 16, 32, and the like. In certain embodiments, step 620 is performed by the manufacturer of the information storage and retrieval system comprising the (N) data storage devices. In certain embodiments, step 620 is performed by the owner of the information storage and retrieval system comprising the (N) data storage devices. In certain embodiments, step 620 is performed at system startup. In certain embodiments, step 620 is performed by a storage services provider based upon the direction of a storage services customer.

In step 630, Applicants' method assigns a different one of the (M) addresses of step 620 to a different one of the (N) data storage devices of step 610. In certain embodiments, step 630 is performed by the manufacturer of the information storage and retrieval system comprising the (N) data storage devices. In certain embodiments, step 630 is performed by the owner of the information storage and retrieval system comprising the (N) data storage devices. In certain embodiments, step 630 is performed at system startup. In certain embodiments, step 630 is performed by a storage services provider based upon the direction of a storage services customer.

In step 640, Applicants' method detects a failure of one of the operational data storage devices, i.e. a failure of one of the addressed devices. As those skilled in the art will appreciate, a host computer, such as host computer 390, cannot write data to, or read data from, a non-addressed data storage device.

In certain embodiments, step 640 is performed by a host computer. In certain embodiments, step 640 is performed by microcode, such as microcode 202 (FIG. 2), disposed in the controlling device adapter, such as device adapter 165 (FIGS. 1, 2). In certain embodiments, step 640 is performed by microcode, such as microcode 204 (FIG. 2), disposed in a monitoring device adapter, such as device adapter 175 (FIGS. 1, 2) if that monitoring device adapter determines that the controlling device adapter has failed. In certain embodiments, step 640 is performed by an SES processor, such as SES processor 212 (FIGS. 2, 3). In certain embodiments, step 640 is performed by a system processor, such as for example system processor 132 (FIG. 1).

Figure 5:
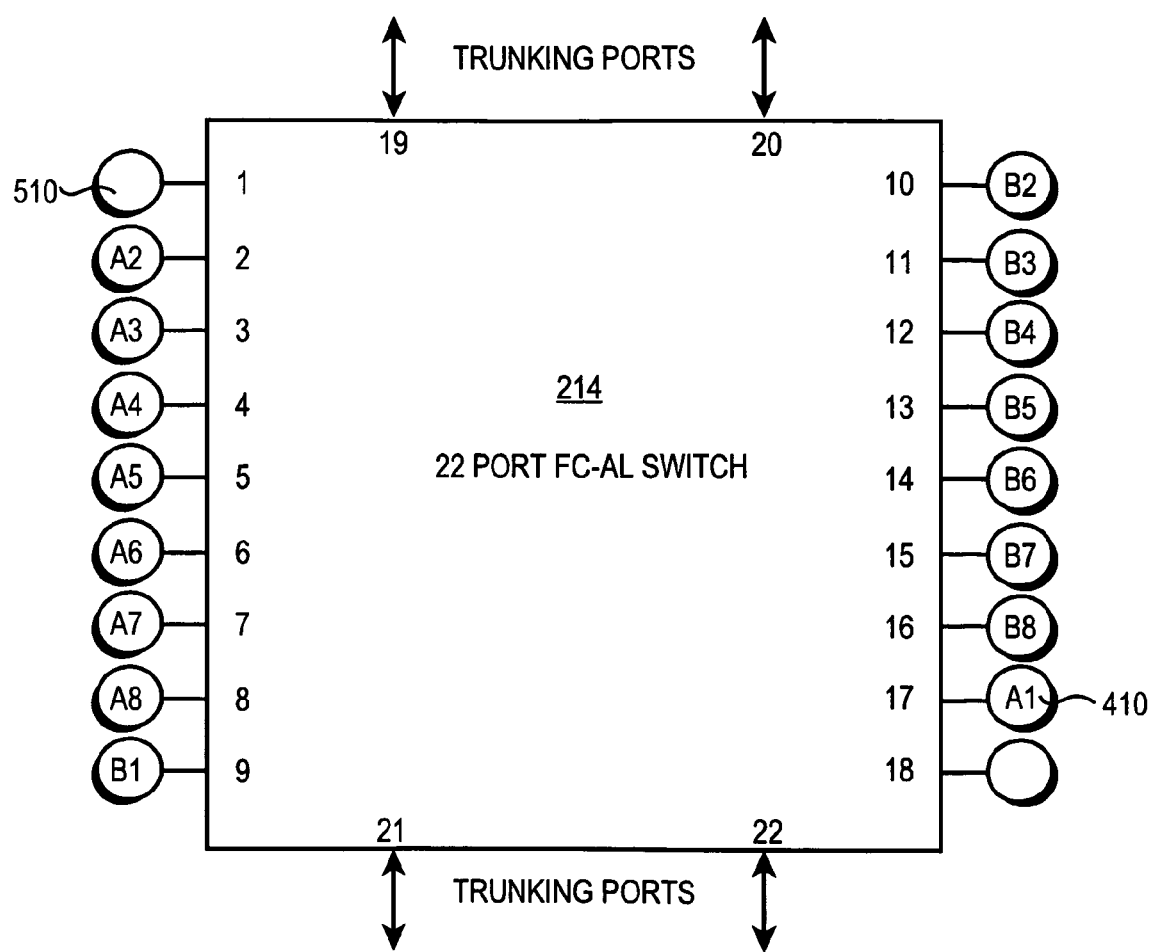
FIG. 5 is a block diagram showing a second configuration of 18 data storage devices and 22 port switch of FIG. 4.

Referring now to FIGS. 5 and 6, in step 650 Applicants' method transfers the address, such as address A1, from the failed data storage device, such as for example data storage device 510 interconnected with port 1 of switch 214, to a previously-non-addressed data storage device, such as data storage device 410 interconnected with switch 214 at port 17. In the illustrated embodiment of FIG. 5, data storage device 510 no longer comprises an assigned address because the address A1 has been transferred to data storage device 410.

In certain embodiments, step 650 is performed by a host computer. In certain embodiments, step 650 is performed by microcode, such as microcode 202 (FIG. 2), disposed in the controlling device adapter, such as device adapter 165 (FIGS. 1, 2). In certain embodiments, step 650 is performed by microcode, such as microcode 204 (FIG. 2), disposed in a monitoring device adapter, such as device adapter 175 (FIGS. 1, 2) if that monitoring device adapter determines that the controlling device adapter has failed. In certain embodiments, step 650 is performed by an SES processor, such as SES processor 212 (FIGS. 2, 3). In certain embodiments, step 650 is performed by a system processor, such as for example system processor 132 (FIG. 1).

In certain embodiments, Applicants' method includes step 660 wherein the method designates the failed data storage device, such as for example failed device 510, as one of the (P) non-addressed data storage devices. In these embodiments, the failed device remains available for subsequent address assignment, and attempted subsequent reuse.

In certain embodiments, individual steps recited in FIG. 6 may be combined, eliminated, or reordered.

In certain embodiments, Applicants' invention includes instructions residing in microcode, such as for example microcode 202 (FIG. 2) and/or 204 (FIG. 2), where those instructions are executed by a processor, such as processor 206 (FIG. 2) and/or 208 (FIG. 2), respectively, to perform steps 620, 630, 640, 650, and/or 670, recited in FIG. 6.

In other embodiments, Applicants' invention includes instructions residing in any other computer program product, where those instructions are executed by a computer external to, or internal to, system 100, to perform steps 620, 630, 640, 650, and/or 670, recited in FIG. 6. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to assign addresses to a plurality of data storage devices, comprising the steps of:

providing a switch and (N) data storage devices, wherein each of said (N) data storage devices is interconnected with said switch, and wherein each of said (N) data storage devices comprises a known physical location;

providing a first device adapter comprising microcode;

interconnecting said first device adapter with said switch;

establishing (M) device addresses, wherein (M) is less than (N);

assigning a different one of each of said (M) device addresses to a different one of said (N) data storage devices, such that said (N) data storage devices comprise (M) address-assigned data storage devices and (P) non-address-assigned data storage devices;

detecting a failure of the (i)th address-assigned data storage device, wherein the (i)th address-assigned data storage device is assigned the (i)th address, and wherein (i) is greater than or equal to 1 and less than or equal to (M), wherein said detecting step is performed by said first device adapter;

transferring the (i)th address from the failed address-assigned data storage device to the (j)th data storage device, wherein said (j)th data storage device comprises one of said (P) data storage devices.

2. The method of claim 1 wherein said transferring step is performed by said first device adapter.

3. The method of claim 2 further comprising the steps of:
providing a second device adapter comprising said microcode;
interconnecting said second device adapter with said switch;
monitoring said first device adapter by said second device adapter;
detecting the failure of said first device adapter by said second device adapter;
wherein said detecting step and said transferring step are performed by said second device adapter.

4. The method of claim 3 further comprising the steps of:
providing a midplane;
interconnecting each of said (N) data storage devices to said midplane;
interconnecting said switch with said midplane.

5. The method of claim 4 further comprising the step of providing a fiber channel arbitrated loop, wherein said interconnecting steps further comprise interconnecting said first device adapter, said second device adapter, and said switch via said fiber channel arbitrated loop.

6. An article of manufacture comprising (N) data storage devices, a switch, a midplane interconnecting each of said (N) data storage devices with said switch, and a computer readable medium having computer readable program code disposed therein to assign addresses to (N) data storage devices, wherein each of said (N) data storage devices is interconnected with a switch, and wherein each of said (N) data storage devices comprises a known physical location, the computer readable program code comprising a series of computer readable program steps to effect:
retrieving (M) pre-determined device addresses, wherein (M) is less than (N);
assigning a different one of each of said (M) device addresses to a different one of said (N) data storage devices, such that said (N) data storage devices comprise (M) address-assigned data storage devices and (P) non-address-assigned data storage devices;
detecting a failure of the (i)th address-assigned data storage device, wherein the (i)th address-assigned data storage device is assigned the (i)th address, and wherein (i) is greater than or equal to 1 and less than or equal to (M);
transferring the (i)th address from the failed address-assigned data storage device to the (j)th data storage device, wherein said (j)th data storage device comprises one of said (P) data storage devices.

7. The article of manufacture of claim 6, further comprising a fiber channel arbitrated loop interconnecting said first device adapter, said second device adapter, and said switch.

8. A computer program product encoded in an information storage medium and usable with a programmable computer processor to assign addresses to (N) data storage devices, wherein each of said (N) data storage devices is interconnected with a midplane interconnected with a switch, and wherein each of said (N) data storage devices comprises a known physical location, comprising:
computer readable program code which causes said programmable computer processor to retrieve (M) pre-determined device addresses, wherein (M) is less than (N);
computer readable program code which causes said programmable computer processor to assign a different one of each of said (M) device addresses to a different one of said (N) data storage devices, such that said (N) data storage devices comprise (M) address-assigned data storage devices and (P) non-address-assigned data storage devices;
computer readable program code which causes said programmable computer processor to detect a failure of the (i)th address-assigned data storage device, wherein the (i)th address-assigned data storage device is assigned the (i)th address, and wherein (i) is greater than or equal to 1 and less than or equal to (M);
computer readable program code which causes said programmable computer processor to transfer the (i)th address from the failed address-assigned data storage device to the (j)th data storage device, wherein said (j)th data storage device comprises one of said (P) data storage devices.

9. The computer program product of claim 8, further comprising a fiber channel arbitrated loop interconnecting said first device adapter, said second device adapter, and said switch.

* * * * *